United States Patent [19]
Nachshon et al.

[11] Patent Number: 5,668,605
[45] Date of Patent: Sep. 16, 1997

[54] OBJECT KEYING IN VIDEO IMAGES BASED ON DISTANCE FROM CAMERA

[75] Inventors: Shalom Nachshon, Kfar Shmaryahu; Menachem Polak, Tel Mond, both of Israel

[73] Assignee: R. T. Set, Givatayim, Israel

[21] Appl. No.: 329,116

[22] Filed: Oct. 25, 1994

[51] Int. Cl.$^6$ .................................................. H04N 5/275
[52] U.S. Cl. ............................................ 348/584; 348/590
[58] Field of Search ...................................... 348/348, 584, 348/586, 590, 25, 598

[56] References Cited

U.S. PATENT DOCUMENTS

| | | | |
|---|---|---|---|
| 4,063,265 | 12/1977 | Lo et al. | 354/294 |
| 4,771,307 | 9/1988 | Kuno et al. | 348/348 X |
| 5,345,313 | 9/1994 | Blank | 348/584 X |
| 5,566,251 | 10/1996 | Hanna et al. | 348/589 |

Primary Examiner—Wendy Garber
Attorney, Agent, or Firm—Mark M. Friedman

[57] ABSTRACT

A method for separating a first image into two or more portions, such as foreground and background portions, based on the distance of the portions from a camera. The method includes detecting a main image using the camera, such as a CCD video camera and measuring distances from the camera to points in the first image. The method further includes separating the main image into two or more portions, such as background and foreground, based on the measured distance of these portions of the image from the camera. One or more of the separated images can then be combined with a secondary image to produce a composite image. To further refine the separation of the two portions of the main image, the contrast is determined between the two portions of the main image in regions of the main image having sufficiently large distance variations. The combining of the two images is then based on the determined contrast in addition to the distances.

17 Claims, 2 Drawing Sheets

OBJECT KEYING IN VIDEO IMAGES BASED ON DISTANCE FROM CAMERA

FIELD AND BACKGROUND OF THE INVENTION

The present invention relates to the separation of an image a portion of which can then be used in the production of a composite image and, more particularly, to the separation of an image for use in the production of a composite image using two or more video images.

Key insertion makes it possible to insert a part of one television image into another to produce a special effect. For example, it is quite common in studio broadcasting to combine an image taken in the studio, typically of an announcer, with one or more background images of various scenes, typically outdoor scenes. The scenes may be produced in real time by a second television camera, they may be pre-recorded still or moving images taken earlier by a television camera, or they may be computer generated images, among other possibilities.

Combining the image of a studio announcer with some other scene gives the viewer the impression that the announcer is present at the scene and/or gives the viewer further information. The use of keying is convenient as it obviates the need for the announcer to be physically present at the actual scene, which may be distant or otherwise not readily accessible, and further obviates the need for installing and periodically replacing a physical image-bearing backdrop behind the announcer.

Various techniques are known for combining video images. Perhaps the most popular is the chroma-key insertion technique, also known as color separation overlay technique. In the chroma-key technique, a television camera is trained on an announcer, or other studio actor, who is located in front of a colored backdrop, which is typically blue. The images from this camera, as well as background images from any of number of suitable sources, are fed to a processor which is able to combine the two images to form a single image. The processor replaces the colored (typically blue) portions of the studio image with the background image to form a combined image featuring the announcer, or other studio actor, surrounded by portions of the background images.

Various attempts have been made to improve the chroma-key technique. Representative of patents describing variations of the chroma-key technique are U.S. Pat. Nos. 4,163,992, 4,202,008 and 4,393,394.

The chroma-key technique, while in widespread use, suffers from a number of disadvantages which limit its versatility. The technique requires the use of a special studio equipped with the proper blue backdrop and suitable lighting systems which satisfy stringent requirements. This limits the applicability of the system to a number of specially equipped studios so that it is not possible to use the technique in less sophisticated studios or outdoors. Furthermore, care must be taken to avoid use of the keying color (typically blue) in the studio. Thus, care must be taken to ensure that the announcers, actors, and every other person or object forming a part of the studio image is completely devoid of the blue color since such presence of the keying color would lead to the highly undesirable substitution of the background image onto undesirable portions of the studio image.

There is thus a widely recognized need for, and it would be highly advantageous to have, a technique for combining video images which would have advantages in the above respects.

SUMMARY OF THE INVENTION

According to the present invention there is provided a method for separating a first image into two or more portions basis the distance of the portions from a camera, comprising the steps of: (a) detecting the first image using the camera; (b) measuring distances from the camera to points in the first image; and (c) separating the first image into two or more portions based on the measured distance of the portions of the image from the camera.

According to features in preferred embodiments of the invention described below, the method further includes combining at least one of the portions of the first image with a second image to produce a composite image.

According to further features in preferred embodiments of the invention described below, the second image, which may be still or moving, is generated simultaneously with the first image or is pre-recorded. Alternatively, the second image is computer generated.

According to still further features in the described preferred embodiments, the measuring distances is effected using a laser range finder.

In a preferred embodiment according to the present invention, the method further includes determining contrast in the first image in regions of the first image having sufficiently large distance variations and combining at least one of the portions of the first image with a second image to produce a composite image based at least partly on the determination of contrast.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
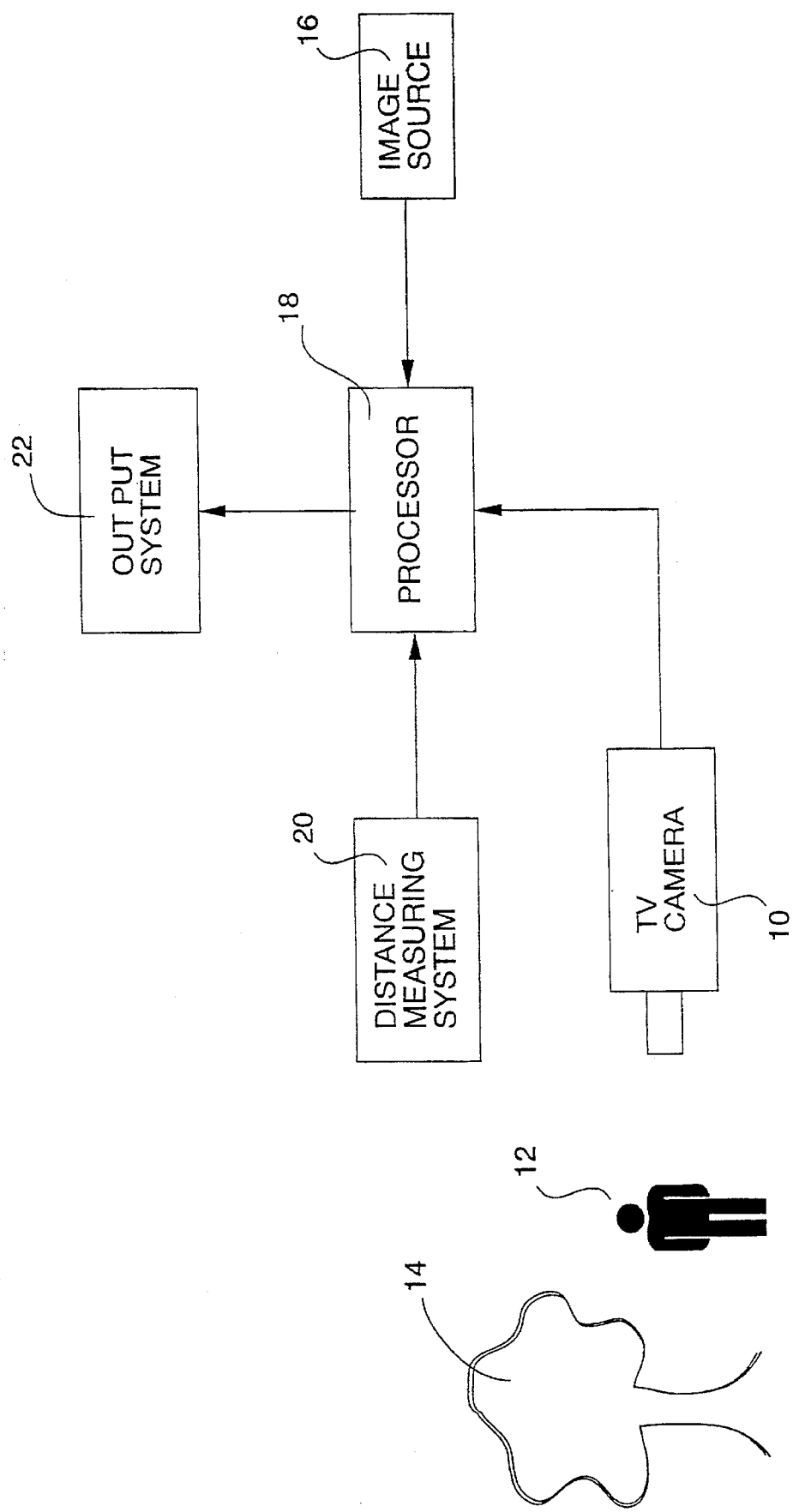
FIG. 1 schematically depicts the methods according to the present invention.

The present invention is of a method for separating a main image into two or more portions based on the distance of the portions from the camera and, in some embodiments, further based on contrast variations in regions of large distance variation. Methods according to the present invention can be used to help efficiently combine one or more portions of the first image with a second image.

The principles and operation of a method according to the present invention may be better understood with reference to the drawing and the accompanying description.

Referring now to the drawings, FIG. 1 schematically illustrates methods according to the present invention. Depicted in FIG. 1 is a camera 10, such as a television camera, preferably one including a charge coupled device (CCD), which is viewing a scene. The scene is made up of a subject, represented in FIG. 1 by a person 12, and the surroundings, represented in FIG. 1 by a tree 14.

For example, it may be desirable to produce a composite image which is made up of: (1) one or more portion of a first image, such as the foreground portion of the image produced by television camera 10 viewing both a subject 12 and its surroundings 14 and (2) a second image which may typically be a background image.

The background image may come from any suitable background image source 16 and may be a still image or a moving image. The second image may be generated simultaneously with the first image, for example by a second television camera (not shown) or it may be pre-recorded. Alternatively, the background image may be computer generated, and the like.

In certain applications, the foreground portion of the image generated by camera 10 and the background image from background image source 16 are fed to a processor 18 wherein the two images are combined so as to produce a single image which includes the subject of the foreground image surrounded by a portion of the background image. The single image is then provided to a suitable storage or output system 22.

The combination of the two images is effected in processor 18 based at least in part on the relative or absolute distances of subject 12 and its surroundings 14 from camera 10. Information regarding distances in the first image are fed to processor 18 from a distance measuring system 20 which may be any suitable system. For example, distance measuring system 20 may be a triangulation system which uses two cameras to determine distances. Alternatively, distance measuring system 20 may take advantage of the focusing mechanism of camera 10 to determine distances. A third alterative involves the use of the variation in the location of objects in the first image as the camera is moved to determine the distance of the objects from the camera. Thus, using a transversely moving camera, an object can be detected to appear to move. The amount of the apparent movement is a function of the distance of the object from the camera. This relationship can be described by the equation:

$$R = f(\Delta x / \Delta \xi)$$

where,
f is the focal distance;
$\Delta x$ is the camera motion; and
$\Delta \xi$ is the image motion in the camera sensor plane.

Preferably, distance measuring system 20 includes a range finder, most preferably a laser range finder which scans the scene to determine the relative or absolute distance of each point of the scene from camera 10.

In operation, a system such as that shown in FIG. 1 would operate as follows. The first image is viewed by camera 10. Distances to some or all points in the scene are measured using a suitable distance measuring system 20 so as to allow the first image to be readily separated into two or more portions based on the distances of the portions from the camera.

When desired, the first and a second image are then combined to produce the composite image, with the combination thus being at least partly based on the measured distances which allow, for example, subject 12 to be separated from its surroundings 14 in the first image so that only subject 12 appears in the composite image surrounded by portions of the second, typically background, image.

In a preferred embodiment of the present invention, the separation of the first image into two or more portions is further determined by analyzing the contrast of the foreground image detected by camera 10 in those regions which feature large distance changes, i.e., near the boundaries of the distance-separated portions of the first image. Thus, in addition to measuring distances to points in the scene, the contrast, as determined by camera 10, between subject 12 and surroundings 14 at selected points of the scene is used to fine-tune the process of forming the final image and increase the resolution of the boundary between the foreground and background images.

Figure 2:
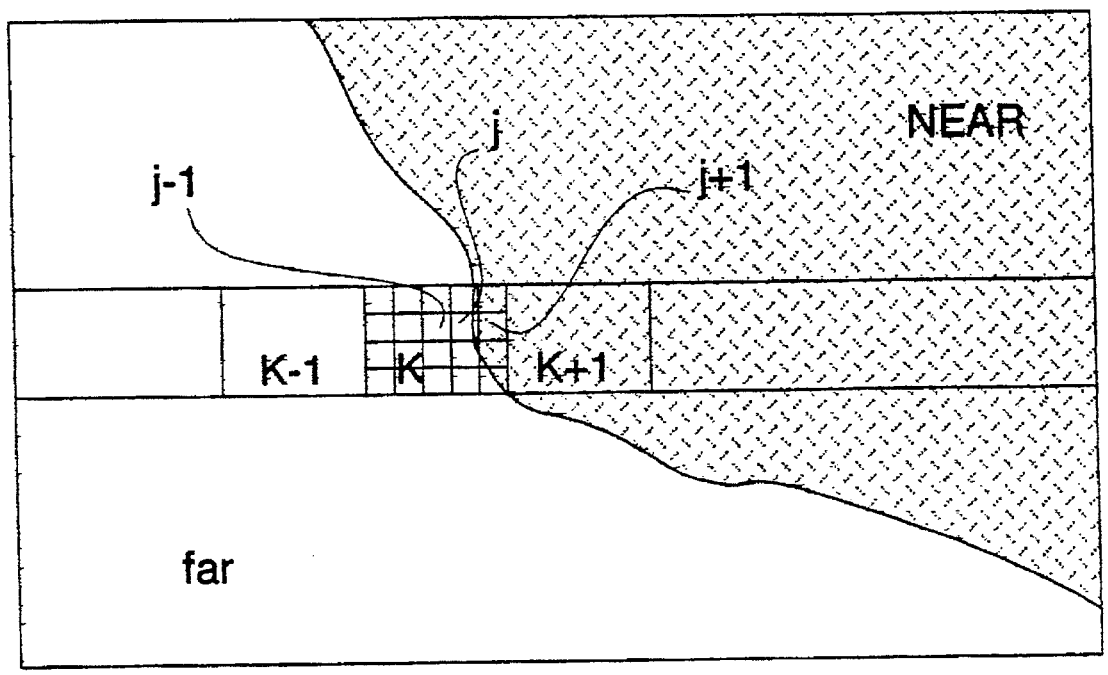
FIG. 2 illustrates the method according to the present invention.

One way of using contrast analysis to enhance the composite image is illustrated in FIG. 2. Shown in FIG. 2 is a small portion of the first image which includes a portion of the boundary between the subject (labelled 'NEAR') and the surroundings (labeled 'far'). Three of the distance measuring pixels, which represent, for example, the resolution of a laser range finder, are indicated by $K_{-1}$, K and $K_{+1}$. From the distance measurements it is determined that $K_{-1}$ is far but that $K_{+1}$ is near. Hence, distance measuring pixel K must span the boundary between the far and near regions.

Within distance measuring pixel K there are a number of CCD pixels of the camera. Several rows and columns of the CCD pixels within K is shown in FIG. 2. By analyzing the contrast of each of the CCD pixels it can be determined that CCD pixel j-1 has a different intensity than CCD pixel j+1, i.e., that there is a significant contrast between the two CCD pixels. This implies that CCD pixel j spans the boundary between the far and near regions.

Use of the contrast analysis thus enhances the resolution of the method without significant cost in terms of computation time and provides a more accurate boundary between the portions of the first image and thus provides a cleaner and more accurate boundaries between the portion of the first and second images which make up the composite image. As will be readily appreciated, use of contrast determination be itself to determine distances is unacceptable. The results would be ambiguous since not every contrast change is associated with a change in distance.

While the invention has been described with respect to a limited number of embodiments, it will be appreciated that many variations, modifications and other applications of the invention may be made.

What is claimed is:

1. A method for separating a first image into two or more portions based on the distance of the portions from a camera, comprising the steps of:
   (a) detecting the first image using the camera;
   (b) measuring distances from the camera to points in the first image;
   (c) separating the first image into two or more portions based on the measured distance of said portions of the first image from the camera; and
   (d) combining at least one of said portions of the first image with a second image to produce a composite image.

2. A method as in claim 1, wherein said distances are relative distances.

3. A method as in claim 2, wherein said distances are absolute distances.

4. A method as in claim 1, wherein said second image is generated simultaneously with said first image.

5. A method as in claim 1, wherein said second image is pre-recorded.

6. A method as in claim 1, wherein said second image is computer generated.

7. A method as in claim 1, wherein said second image is a still image.

8. A method as in claim 1, wherein said second image is a moving image.

9. A method as in claim 1, wherein said measuring distances is effected using triangulation.

10. A method as in claim 1, wherein said measuring distances is effected using focusing of the camera.

11. A method as in claim 1, wherein said measuring distances is effected using moving camera techniques.

12. A method as in claim 1, wherein said measuring distances is effected using a range finder.

13. A method as in claim 12, wherein said range finder is a laser range finder.

14. A method as in claim 1, further comprising determining contrast in the first image in regions of the first image having sufficiently large distance variations.

15. A method as in claim 1, wherein said combining of at least one of said portions of the first image with a second image to produce a composite image is further based on said determination of contrast.

16. A method as in claim 15, wherein the camera includes a CCD.

17. A method as in claim 16, wherein the contrast is determined by the camera.

* * * * *